US009528192B1

(12) United States Patent
Chen

(10) Patent No.: US 9,528,192 B1
(45) Date of Patent: Dec. 27, 2016

(54) SOLAR POWERED $CO_2$ CONVERSION

(71) Applicant: The United States of America as Represented by the Administrator of the National Aeronautics & Space Administration (NASA), Washington, DC (US)

(72) Inventor: Bin Chen, Palo Alto, CA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 600 days.

(21) Appl. No.: 13/956,218

(22) Filed: Jul. 31, 2013

Related U.S. Application Data

(60) Provisional application No. 61/753,289, filed on Jan. 16, 2013.

(51) Int. Cl.
| | |
|---|---|
| *C25B 9/18* | (2006.01) |
| *C25B 3/04* | (2006.01) |
| *C25B 1/00* | (2006.01) |

(52) U.S. Cl.
CPC .............. *C25B 9/18* (2013.01); *C25B 1/003* (2013.01); *C25B 3/04* (2013.01)

(58) Field of Classification Search
CPC ............... C25B 9/18; C25B 3/04; C25B 1/003

(Continued)

(56) References Cited

U.S. PATENT DOCUMENTS

| | | |
|---|---|---|
| 4,609,441 A | 9/1986 | Frese, Jr. et al. |
| 5,022,970 A | 6/1991 | Cook et al. |

(Continued)

OTHER PUBLICATIONS

Cook et al, "High Rate Gas Phase CO2 Reduction to Ethylene and Methane Using Gas Diffusion Electrodes," J. Electrochem. Soc., vol. 137, No. 2, Feb. 1990, pp. 607-608.*

(Continued)

*Primary Examiner* — Keith Hendricks
*Assistant Examiner* — Colleen M Raphael
(74) *Attorney, Agent, or Firm* — Robert M. Padilla; John F. Schipper

(57) ABSTRACT

Methods and devices for reducing $CO_2$ to produce hydrocarbons are disclosed. A device comprises a photoanode capable of splitting $H_2O$ into electrons, protons, and oxygen; an electrochemical cell cathode comprising an electro-catalyst capable of reducing $CO_2$; $H_2O$ in contact with the surface of the photoanode; $CO_2$ in contact with the surface of the cathode; and a proton-conducting medium positioned between the photoanode and the cathode. Electrical charges associated with the protons and the electrons move from the photoanode to the cathode, driven in part by a chemical potential difference sufficient to drive the electrochemical reduction of $CO_2$ at the cathode. A light beam is the sole source of energy used to drive chemical reactions. The photoanode can comprise $TiO_2$ nanowires or nanotubes, and can also include $WO_3$ nanowires or nanotubes, quantum dots of CdS or PbS, and Ag or Au nanostructures. The cathode can comprise a conductive gas diffusion layer with nanostructures of an electro-catalyst such as Cu or Co.

13 Claims, 3 Drawing Sheets

(58) Field of Classification Search
USPC .................................. 205/340; 136/243–265
See application file for complete search history.

(56) References Cited

U.S. PATENT DOCUMENTS

| | | | |
|---|---|---|---|
| 7,064,150 B2 | 6/2006 | Matsui | |
| 8,188,362 B2 | 5/2012 | Kaneko | |
| 8,663,447 B2 | 3/2014 | Bocarsly et al. | |
| 2006/0172179 A1* | 8/2006 | Gu | B82Y 30/00 |
| | | | 429/482 |
| 2010/0133110 A1* | 6/2010 | Nocera | C25B 1/003 |
| | | | 205/340 |
| 2010/0159305 A1* | 6/2010 | Yan | H01M 4/8605 |
| | | | 977/742 |
| 2010/0258446 A1 | 10/2010 | Mohapatra et al. | |
| 2012/0208903 A1 | 8/2012 | Gafney | |
| 2013/0032470 A1 | 2/2013 | Mohapatra et al. | |
| 2013/0048506 A1* | 2/2013 | Chen | C10G 2/50 |
| | | | 205/317 |
| 2013/0146470 A1* | 6/2013 | Wang | H01M 16/003 |
| | | | 205/343 |
| 2014/0326611 A1* | 11/2014 | Yan | C25B 13/08 |
| | | | 204/242 |

OTHER PUBLICATIONS

Dey, et al., Photo-catalytic reduction of carbon dioxide to methane using TiO2 as suspension in water, Journal of Photochemistry and Photobiology A: Chemistry, 2004, 503-508, 163, Elsevier B.V.

Barton, et al., Selective Solar-Driven Reduction of CO2 to Methanol Using a Catalyzed p-GaP Based Photoelectrochemical Cell, Journal of American Chemical Society Communications, Apr. 26, 2008, 6342-6344, American Chemical Society.

Ganesh, Conversion of Carbon Dioxide to Methanol Using Solar Energy—A Brief Review, Materials Sciences and Applications, Oct. 2011, 1407-1415, 2, Scientific Research.

* cited by examiner

SOLAR POWERED CO₂ CONVERSION

ORIGIN OF THE INVENTION

The invention described herein was made in the performance of work under NASA contract number NNX08AQ41A and is subject to the provisions of Public Law 96-517 (35 U.S.C. §202) in which the Contractor has elected not to retain title.

FIELD OF THE INVENTION

One or more embodiments of the present invention relate to apparatuses and methods for reduction of $CO_2$.

BACKGROUND

The burning of carbon fuels dominates energy production and will continue to do so for the foreseeable future. Carbon sequestration is currently being pursued in an attempt to reduce $CO_2$ emissions. However, a more elegant and long-lasting solution would be to convert emitted $CO_2$ back into useable materials that could then be re-burned for carbon neutral energy production or used for other purposes, such as feed stock for chemical syntheses. Photosynthesis does this naturally, and programs to reduce deforestation or plant new forests and other plants have been proposed. Converting waste $CO_2$ into usable materials at the source (such as vehicles and smokestacks) could also help. Further, there are extraterrestrial applications of $CO_2$ conversion such as the manufacture of hydrocarbon fuels on Mars from atmospheric $CO_2$.

Studies show that three processes, photocatalysis, electrochemistry, or photoelectrochemistry, can be used for $CO_2$ conversion [Gattrell and Gupta, 2006]. Photocatalysis has been successfully demonstrated using photocatalysts (e.g., $TiO_2$, ZnO and CdS). The main conversion selectivity can be challenging and depends sensitively and selectively on the properties of the photocatalysts. The products range from methane, methanol, ethylene, to formic acid and formaldehyde [Saladin et al., 1995], although the optical to chemical conversion efficiency has generally been low, less than 1 percent [Taniguchi, 1989].

Electrochemical conversion of $CO_2$ has been based primarily on bulk metal electrodes, such as Zn, Pb, Sn, In, Cd, Cu, Au, Hg or metal alloys such as Cr—Ni—Mo. The main conversion products include formic acid, oxalic acid, methane, and hydrogen [Taniguchi, 1989]. Semiconductor electrodes $TiO_2$ or GaAs [Monnier et al., 1980] can also generate methane and methanol, with chemical conversion levels as high as 100 percent [Canfield and Frese, 1983]. However, such an electrochemical approach requires the use of an electricity source with limited device platforms, and product selectivity is generally low.

On the other hand, photoelectrochemistry has also been demonstrated successfully in the conversion of $CO_2$ into hydrocarbons such as methane, methanol, and ethylene, using mainly bulk p-type semiconductors as electrode materials, e.g., InP, GaAs and CdTe[Ito et al., 1984]. While the electrochemical efficiency is often high (>30 percent), the light conversion efficiency is usually low (<1 percent).

Although not heretofor applied to $CO_2$ conversion, the idea of using solar-generated electricity to power a photoelectrochemical cell (PEC) was first proposed and demonstrated using a silicon solar cell to produce hydrogen from water in a PEC cell using a bulk $TiO_2$ photoanode [Morisaki et al., 1976]. A more recent example using a dye-sensitized solar cell to provide power for water splitting in a PEC was described by Sivula et al. ("New nanostructures enhance solar water splitting with hematite," SPIE Newsroom, 10.1117/2.1201007.003145,2010).

SUMMARY OF THE INVENTION

Methods and devices for reducing $CO_2$ are disclosed. In one embodiment, the device comprises: a photoanode capable of splitting water into electrons, protons, and oxygen; a cathode comprising an electrocatalyst capable of reducing $CO_2$; liquid or gaseous water in contact with the surface of the photoanode; $CO_2$ in contact with the surface of the cathode; and a proton-conducting medium positioned between the photoanode and the cathode. The proton-conducting medium is an electrical insulator with low $O_2$ permeability. The electrons flow in a conductor from the photoanode to the cathode at a chemical potential sufficient to drive the electrochemical reduction of $CO_2$ at the cathode. Light is the sole source of power used to drive chemical reactions. The photoanode may comprise $TiO_2$ nanowires or nanotubes, and may also include $WO_3$ nanowires or nanotubes, quantum dots of CdS or PbS, or Ag nanowires to broaden the range of spectral absorption and enhance light conversion efficiency. The nanowires or nanotubes can be attached to either a transparent conductive electrode (e.g., indium tin oxide, fluorine doped tin oxide, carbon nanotubes, or graphene) or a conductive gas diffusion layer, preferably aligned to be substantially parallel to each other and perpendicular to the electrode surface.

The cathode may comprise a conductive gas diffusion layer with nanostructures of an electrocatalyst such as Cu dispersed thereon. The gas diffusion layer typically comprises carbon fibers and a hydrophobic binder. The cathode may further comprise a photosensitizer capable of enhancing the electrocatalytic reduction of $CO_2$. Example photosensitizers include intrinsically conducting polymers such as polythiophene.

The proton-conducting medium can be made from NAFION®, and may also include a buffered electrolyte such as $KHCO_3$.

A light concentrator can also be included to select and concentrate light on the photoanode.

Methods for reducing $CO_2$ are disclosed, wherein one method comprises: providing an integrated photovoltaic electrochemical cell (iPVEC), exposing the photoanode to water and photons such that water is split into electrons, protons, and oxygen at the photoanode, reducing $CO_2$ electrocatalytically at the cathode using the electrons generated at the photoanode. The electrons flow in a conductor from the photoanode to the cathode at a chemical potential sufficient to drive the electrochemical reduction of $CO_2$ at the cathode.

In one embodiment, the iPVEC comprises a photoelectrochemical cell with two electrodes comprising a photoanode and a cathode, with a proton-conducting medium positioned between the two electrodes. The water can be supplied as liquid water or as water vapor (e.g., an inert gas containing water vapor). Introduction of water into an inert gas can be achieved through bubbling the gas through a container of liquid water, with or without heating. The relative humidity can be optimized to promote $CO_2$ reduction vs. water splitting, and can be increased as demand increases (e.g., during increased supply of $CO_2$ to the cathode).

In some embodiments, the $CO_2$ is supplied from a device or apparatus that produces $CO_2$ as a byproduct of combustion.

In some embodiments, the photoelectrochemical cell is able to maintain an efficiency of reducing more than 10 percent of the $CO_2$ within a time period ranging from 1 to 100 minutes.

In some embodiments, the $CO_2$ is supplied from a planetary atmosphere. The $CO_2$ from the planetary atmosphere can be provided at native concentrations, provided from $CO_2$ sequestration, or can be concentrated in a $CO_2$ scrubber prior to being provided to the iPVEC. Gas containing $CO_2$ can be flowed through beds of sorbent materials such as activated carbon. Once the sorbent material is saturated, the adsorbed $CO_2$ can be desorbed via a flow of low $CO_2$ gas such as air, or by elevating the temperature of the sorbent material in order to promote $CO_2$ desorption. The products of $CO_2$ reduction can be stored for use as a fuel, or reused for combustion by feeding the reduction products back into a combustion chamber in fuel cells.

DETAILED DESCRIPTION

Figure 1:
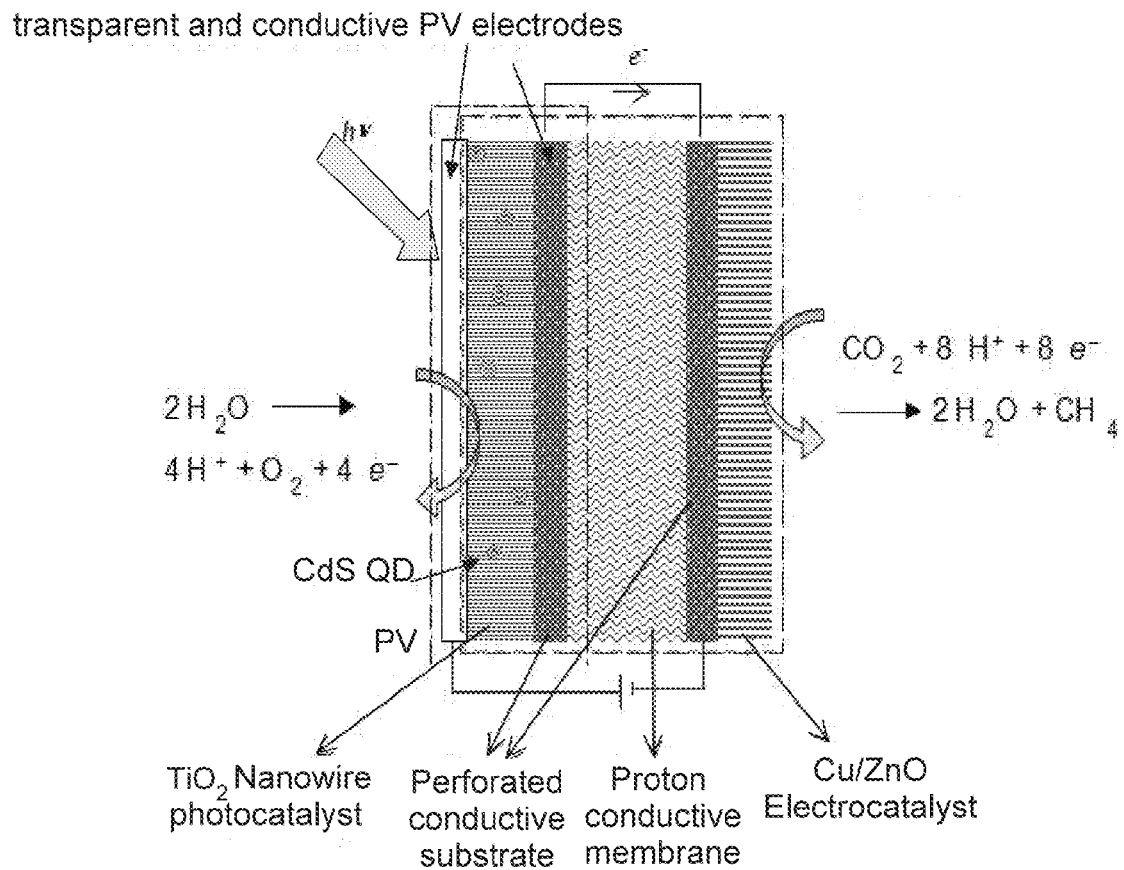
FIG. 1 shows a cross-sectional representation of an embodiment of an integrated photovoltaic cell/photoelectrochemical cell (iPVEC).

Before the present invention is described in detail, it is to be understood that unless otherwise indicated, this invention is not limited to specific materials, polymers or photocatalysts. It is also to be understood that the terminology used herein is for the purpose of describing particular embodiments only and is not intended to limit the scope of the present invention.

It must be noted that as used herein and in the claims, the singular forms "a," "and" and "the" include plural referents unless the context clearly dictates otherwise. Thus, for example, reference to "a polymer" includes two or more polymers, and so forth.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention. Where the modifier "about" is used, it is understood that the stated quantity may vary by up to ±10 percent. Where the modifier "substantially" is used, it is understood that the stated quantity may vary by up to ±5 percent.

DEFINITIONS

As used herein, the term "$CO_2$ conversion" or "converting $CO_2$" refers to the electrochemical reduction of $CO_2$, producing reduced carbon in the form of hydrocarbons, alcohols, aldehydes, acids, and the like.

As used herein, the term "PEC" refers to a photoelectrochemical cell, wherein light is absorbed on a photosensitized electrode of an electrochemical cell in a way that facilitates an electrochemical reaction. In a typical example, the photosensitized electrode is a semiconductive material such as $TiO_2$.

As used herein, the term "PVC" refers to a photovoltaic cell which converts light to electrical power. The term is used generically to refer to any technology, whether solid state or liquid.

As used herein, the term "iPVEC" refers to an integrated photovoltaic/photoelectrochemical cell comprising both photovoltaic conversion of light to electrical energy and a photoelectrochemical cell in a unified structure.

As used herein, the term "proton-conducting medium" refers to a medium in which protons can move under the influence of an electric field or a chemical gradient. Specific proton-conducting media that are useful in embodiments of the present invention are electrical insulators that do not conduct electrons, and they are impermeable to larger atoms and molecules such as oxygen.

As used herein, the term "electrical insulator" refers to a material having little or no conductivity for electrons in the sense that any non-zero electron currents that flow through the material are much less than currents flowing by the sum of all other available paths between two reference points. In the case of proton-conducting media, there may be conduction mechanisms that do not involve electrons due to ion mobility (and specifically proton mobility due to proton conduction mechanisms).

As used herein, the term "intrinsically conducting polymer" refers to a polymer with electronic conduction (conductivity via electron mobility as opposed to ion mobility). The conduction is through the polymer itself and is not provided through the use of a conductive filler or dopant.

As used herein, the term "nanostructures" refers to any object having a size range generally between about 10 nm and about 100 nm. Some nanostructures have aspect ratios near unity and shapes that are approximately spherical or polyhedral (cubic, tetrahedral, etc.). Others such as "nanowires" have a large aspect ratio of greater than 10:1. Still others ("nanotubes") have a tubular structure with a similar large aspect ratio, up to about 1000:1.

As used herein, the term "quantum dot" refers to an object having photosensitivity and a size less that the relevant wavelength of light. By adjusting the size of a quantum dot, the peak absorption wavelength can be tuned. Embodiments of the present invention typically use structures comprising nanowires or nanotubes with a set of much smaller quantum dots distributed over their surfaces.

As used herein, the term "gas diffusion layer" or GDL refers to a membrane or film that is highly porous to gases but impermeable to liquids. Typical examples are constructed from a disordered mat of fibers bound by a hydrophobic resin. Carbon fibers and fluorocarbon resins are commonly used. Pore sizes are typically a few microns, and gas porosity is typically at least 70 percent.

Overview

The present application discloses novel integrated photoelectrochemical devices that combine electrolysis of water at a photoanode and electrocatalytic reduction of $CO_2$ at a cathode using only light to drive the conversions. Devices such as $TiO_2$ photovoltaic cells, electrocatalytic cells capable of reducing $CO_2$, and photoelectrochemical cells configured to split water are known in the art as distinct platforms and have not heretofor been integrated into a unitary device. The integrated devices have unique capabilities and applications not present in prior art devices or previously possible. These known devices are briefly described below.

Photovoltaic devices or cells (PVCs) based on $TiO_2$ have been widely studied, although they tend to exhibit low efficiencies and have not yet been adopted for commercial solar power applications in significant quantity. Many variations are possible. Most PVCs are generally constructed as p-n or p-i-n diodes and depend on the diode structure to separate photoelectrons and holes in order to create a preferred direction for the flow of electrical current. In contrast, $TiO_2$ PVCs are better described as photoelectrochemical cells (PECs) used to generate electrical power (Minutillo, J. et al., "Development of $TiO_2$ Nanoparticle-Based Solar Cells," 2008, retrieved on-line Jan. 13, 2012 from academics.adelphi.edu/artsci/bio/pdfs/) nonoparticle_based_solar_cells.pdf). The $TiO_2$ is affixed to a transparent electrode (anode) and sensitized with a dye to provide increased photoabsorption at visible wavelengths, $\lambda = c/\nu$ An electrolyte with an iodide/triiodide redox couple and a counter electrode (cathode) are provided. The relevant photochemistry and electrochemistry is given by:

$$h\nu + 2H_2O \rightarrow 2H^+ + 2OH^-, \quad (1)$$

$$h\nu + 2H_2O \rightarrow 4H^+ + O_2 + 4e^-, \quad (2)$$

Electrochemical cells can be configured to reduce $CO_2$ and can produce a variety of end products. $CH_4$ production is favored when using a copper electrocatalyst (i.e., a copper-containing cathode). The reaction at the cathode is $$CO_2 + 8H^+ + 8e^- \rightarrow CH_4 \text{ (gas)} + 2H_2O \text{ (liquid)}. \quad (3)$$

A suitable electrolyte containing chloride or bicarbonate provides good proton conductivity between electrodes. Normally, the electrons are supplied from an electrical power source.

A widely described application of photoelectrochemical cells or PECs is for splitting water into hydrogen and oxygen. $TiO_2$ is frequently used as the photoanode, and the reaction is $$2H_2O \text{ (liquid)} + h\nu \rightarrow O_2 \text{ (gas)} + 4H^+ + 4e^-. \quad (4)$$

Oxygen evolves and is collected over the photoanode. The protons travel through an electrolyte (e.g., $Na_2SO_4$, $KHCO_3$) to a counter electrode (cathode). Electrons travel through another circuit to recombine with the protons so that hydrogen gas evolves at the cathode.

Embodiments of the present invention combine the photoelectrochemical generation of electrical power and protons (electrons and protons at useful potential differences), with electrochemical reduction of $CO_2$ in a single unified structure, using an integrated PVC/PEC (integrated photovoltaic cell/photoelectrochemical cell or iPVEC). This device combines a photosensitive anode that splits water and generates electrical energy with an electrocatalytic cathode for the reduction of $CO_2$. The electrodes are separated by a proton-conducting medium. In some embodiments of the invention, an iPVEC comprises a photoanode capable of splitting water into electrons, protons, and oxygen, a cathode with an electrocatalyst capable of reducing $CO_2$, a supply of water at a surface of the photoanode, a supply of $CO_2$ at a surface of the cathode, and an electrically insulating proton-conducting medium between the photoanode and the cathode. The proton-conducting medium allows protons to flow from the photoanode to the cathode but is impermeable to larger atoms and molecules such as oxygen and water. Electrons generated at the photoanode are allowed to flow to the cathode by another route, where the electrons provide the necessary electrical power for the electrocatalytic reduction of $CO_2$. The components and arrangement of components are described in greater detail below.

Integrated Photovoltaic/Photo Electrochemical Cells

The various functions of power generation, water splitting, and $CO_2$ reduction can be integrated into a single device using a variety of specific hardware configurations. Integration can serve to minimize device size, share hardware, share operating functions, and provide self-regulation. In some embodiments, a PVC is used to provide the electrical power to drive an electrochemical cell configured to reduce $CO_2$. The PVC can be a $TiO_2$-based PEC, although other PVCs can also be used. Mechanical integration can be implemented, for example, by sharing one electrode such that one electrode of the PVC serves as an electrode of the electrochemical cell. The two devices can be constructed in planar form and can have the same area. As long as the open-circuit voltage of the PVC exceeds the potential required to drive the electrochemical reaction, $CO_2$ can be reduced. The rate of $CO_2$ reduction is determined by the supply of $CO_2$ and the available current from the PVC.

In some embodiments, further integration can be achieved by using a water-splitting PEC instead of a closed-cycle PVC that generates only electrical power. In these embodiments, the incoming light energy is used to split water to form protons, electrons, and oxygen. The oxygen can be collected as a byproduct or vented. Water can be provided in liquid or gaseous form. Where large-area small-thickness designs are preferred, supplying the water in gaseous form can be preferable, because less pressure and structural strength can be sufficient to drive water through the device at adequate flow rates, although both liquid and gaseous embodiments are possible.

Both the electrons and protons produced from the water splitting reactions can be provided to the electrochemical cell to enhance the reduction of $CO_2$ using, for example, the reaction in Eq. (3). In some embodiments, the water-splitting photoanode is separated from the electrocatalytic cathode by a proton-conducting medium. A current path is also provided for electrons to flow separately from the photoanode to the electrocatalytic cathode. In accordance with the reactions in Eqs. (3) and (5), for every $CO_2$ molecule reduced, there is a net consumption of 4 $H_2O$ molecules in the PEC, a net production of two $O_2$ molecules in the PVC, and a net production of one $CH_4$ molecule and two $H_2O$ molecules in the electrochemical cell.

Figure 2:
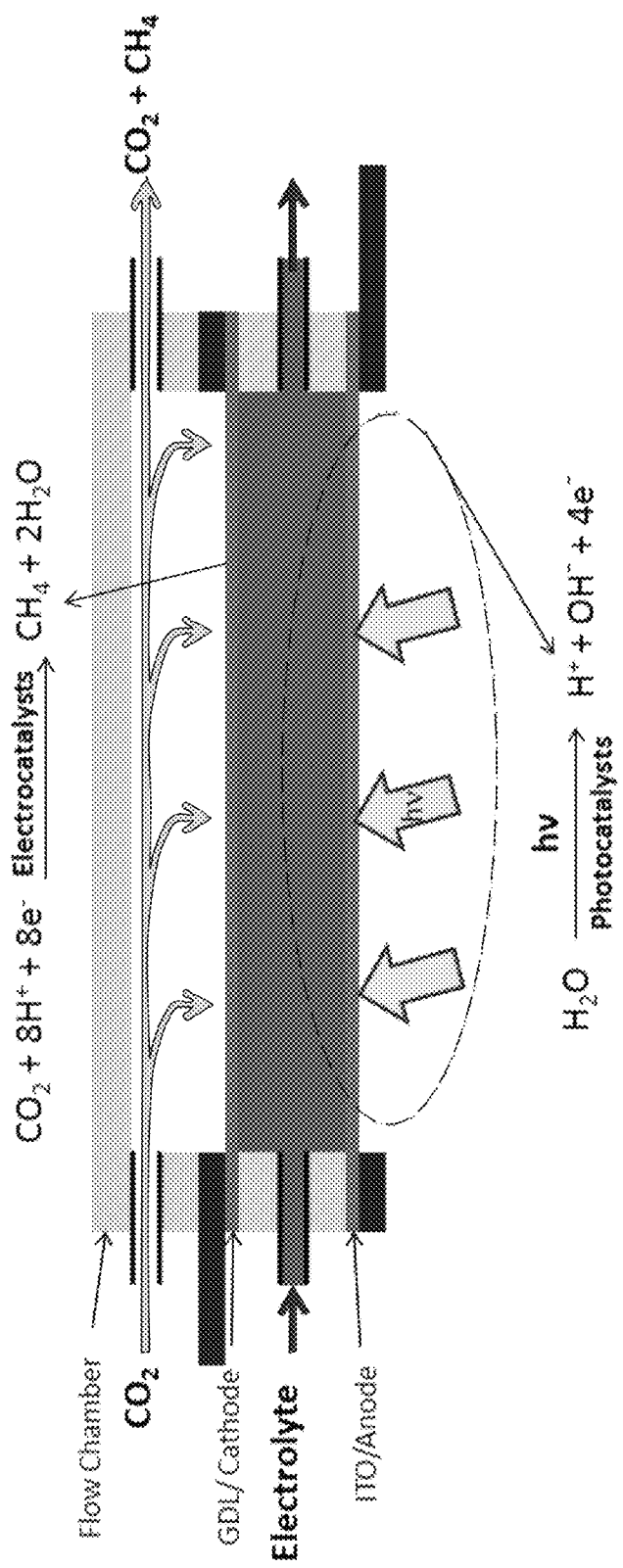
FIG. 2 shows a cross-sectional representation of a second embodiment of an iPVEC.

Two exemplary embodiments of an iPVEC using a proton-conducting medium are shown in FIGS. 1 and 2. Common elements include a photoanode and an electrocatalytic cathode, separated by the proton-conducting medium. A supply of $H_2O$ is provided at the photoanode, and a supply of $CO_2$ is provided at the cathode. A conductive path allows electrons generated at the photoanode to flow to the cathode on demand to provide sufficient electrons to balance the protons arriving at the cathode through the proton-conducting medium.

In the embodiment of FIG. 1, an anode, solid state proton-conducting medium, and cathode are constructed as a sandwich structure, with the fluids and/or gases supplied to the outside surfaces of the sandwich. Referring to FIG. 1, a photoanode comprising aligned $TiO_2$ nanowires 104 is formed on a porous electrode 102; the nanowires 104 are optionally sensitized for more efficient absorption of available visible light using quantum dots 106, and may also be mixed with $WO_3$ nanowires (not shown) for improved visible light absorption. The porous electrode 102 can be a gas diffusion layer (GDL) such as carbon paper. This electrode serves as the support structure and current collector for the nanowire photoanode of the iPVEC. An additional porous and transparent conductive electrode 100 is disposed to provide a counter electrode for the water splitting photoelectrochemical reaction. The electrocatalytic cathode comprises a GDL 108 (such as carbon paper) and nanostructures of an electrocatalyst 110 such as Cu. A solid state proton-conducting medium 112 comprising NAFION is positioned between the porous electrode 102 and the GDL 108. The porous electrode 102 and the GDL 108 are in electrical contact, typically by means of an array of thin contact vias (not shown). $H_2O$ and photons are supplied to the $TiO_2$ nanowires 104; irradiation of the photoanode with light (hv) of sufficient energy and intensity results in production of $O_2$. $CO_2$ is supplied to the electrocatalyst 110; supply of electrons from the photoanode results in production of $CO_2$ reduction products such as $CH_4$ and $H_2O$. $H_2O$ can be supplied from an external source to the $TiO_2$ nanowires. $O_2$ formed at the photoanode can be collected or vented as desired.

In the embodiment of FIG. 2, two flow chambers or microchannels are provided, a liquid flow chamber 220 adjacent to the photo anode and a gas flow chamber 222 adjacent to the cathode. The flow chambers are separated by the GDL 212 supporting the electrocatalyst. The liquid flow chamber 220 supplies $H_2O$ to the photoanode and carries away evolved $O_2$. The liquid can also comprise an electrolyte, optionally including a buffer. As such, the liquid can function as the proton-conducting medium. The geometry and flow rates are typically low enough that the liquid flow is substantially laminar. As such, any gases present in the liquid are carried with the liquid flow; gas flow across the thickness of the channel is driven only by diffusion, which can be much slower than the liquid flow rate. The gas flow chamber 222 supplies $CO_2$ to the cathode and carries away the reduction products such as $CH_4$ and $H_2O$ released at the cathode.

The photoanode depicted in FIG. 2 comprises aligned $TiO_2$ nanowires 204, formed on a transparent electrode 202 (e.g., indium tin oxide); the nanowires 204 are optionally sensitized for more efficient absorption of available visible light using $WO_3$ nanowires and/or quantum dots 206. A conductive path (not shown) connects the transparent electrode 202 to the conductive GDL 208 in a manner sufficient to allow electrons to be supplied on demand to the electrocatalyst 210. The cathode comprises a GDL 208 (such as carbon paper) and nanostructures of an electrocatalyst 210 such as Cu.

The liquid and gas flow chambers 220 and 222 shown in FIG. 2 can be implemented using any convenient channel and flow geometry. For large area devices designed to maximize exposure to sunlight, for example, the thickness of the flow channel can be much smaller than either in-plane dimension of the large area device. Microfluidic flow designs can be used. The flow can be a single thin sheet fed from an input plenum, or an array of series- and/or parallel-connected channels can be arranged to distribute and control the flow to reach all regions of the electrodes.

Photoanodes

The photoanode can comprise photoactive materials such as semiconductors that can generate photoelectrons ($e^-$) in the conduction band and holes ($h^+$) in the valence band of the semiconductor. Typical semiconductors that are useful as photoanodes include $TiO_2$ or mixtures of $TiO_2$ and $WO_3$, and the like. In some embodiments, the photoanode comprises $TiO_2$ nanowires or nanotubes, and can also comprise sensitizers to improve light absorption at particular wavelengths. $TiO_2$ absorbs predominately ultraviolet (UV) light (<~400 nm wavelengths), and higher wavelength light is allowed to pass through. This embodiment can be preferred in environments where UV light is abundant (e.g., high altitude, space, Mars surface). Sensitizers can include dyes, quantum dots, and the like. These sensitizers absorb light at additional wavelengths such as visible (~400-750 nm) and infrared wavelengths (>~750 nm). The sensitizers can be distributed over the surface of the nanowires or nanotubes. Suitable quantum dots can be made from a variety of photosensitive materials including PbS, CdS and CdSe. Their size can be adjusted to optimize wavelength sensitivity to match the wavelength of available light, for example, the quantum dot diameters may be 2-10 nm.

The performance of the photoanode can be further enhanced by including $WO_3$ nanowires or nanotubes that have different wavelength sensitivity from $TiO_2$. Further, "plasmonic enhancement" can be provided by including nanowires of a reflective metal such as Ag. Such reflective nanowires can serve to increase the light delivered to light absorbing elements of the photoanode.

In some embodiments, the nanowires or nanotubes are physically and electrically connected to a transparent conductive electrode. It can be beneficial to arrange the nanowires or nanotubes so that their ends are attached to the transparent conducting electrode and substantially parallel to one another. This arrangement can improve the collection of photons and electrons by the nanowires or nanotubes, reduce light scattering, and deliver electrons to the electrode. Any suitable transparent conductive electrode can be used such as those made from indium tin oxide, fluorine-doped tin oxide, doped zinc oxide, carbon nanotubes, graphene, and the like.

Electrocatalytic Cathodes

The electrocatalytic cathode comprises an electrocatalyst on a conductive support. In some embodiments the cathode comprises nanostructured catalytic particles dispersed over the support. A convenient support is a gas diffusion layer (GDL) such as the carbon paper commonly used in fuel cells. Suitable carbon papers are made from disordered mats of carbon fibers, typically with a hydrophobic binder such as TEFLON® or other fluorocarbons. Typical properties include high porosity (~80 percent), pore sizes in the range of about 1-10 microns, and moderate electrical conductivity such that the carbon papers can be used as electrodes without significant voltage drop across the material. Carbon paper GDLs can be used as a conductor to form the cathode, and can also serve as a support for an electrocatalyst. In some embodiments the support further comprises a metal oxide such as zinc oxide, optionally in the form of nanostructures such as nanowires. Zinc oxide also has catalytic activity that can enhance the overall reaction efficiency.

The electrocatalyst at the cathode can be made from any catalytic material capable of reducing $CO_2$. The choice of electrocatalyst affects the end products of reduction. As reported by Jitaru ("Electrochemical Carbon Dioxide Reduction—Fundamental and Applied Topics (Review)," *J. Univ. Chem. Tech. & Metallurgy*, 42(4), 333-44, 2007), in aqueous solution, In, Sn, Hg, and Pb favor production of formic acid; Zn, Au, and Ag favor production of CO; metallic Cu favors production of hydrocarbons, aldehydes and alcohols. In non-aqueous solutions, Pb, Tl, and Hg favor production of oxalic acid; Cu, Au, Ag, In, Zn, and Sn favor production of CO and carbonates; Ni, Pd, and Pt favor production of CO; Al, Ga, and Group VIII elements (other than Ni, Pd, and Pt) favor formation of both CO and oxalic acid. The choice of pH and electrolyte can further create a bias toward particular reduction products. The present invention is not limited to a particular electrocatalyst, although Cu will be used as exemplary, because it generally favors production of hydrocarbons such as $CH_4$. One skilled in the art can readily determine which electrocatalyst provides the particular reduction products desired.

In some embodiments, the cathode further comprises a photosensitizer that enhances the chemical reduction of $CO_2$. In these embodiments, the overall system configuration allows at least a portion of the incident light to illuminate the cathode. For example, while most of the available light can be directed to illuminate the photoanode, parts of the iPVEC can be generally made sufficiently transparent that a portion of the light passes through the photoanode and intervening structures to illuminate the cathode as well. Examples of suitable photosensitizers include intrinsically conducting polymers that exhibit photosensitivity, as well as fullerenes, carbon nanotubes, and graphene. Graphene can be easy to process and can provide mechanical strength. Intrinsically conducting polymers are also easy to process. Particular polymers can be selected based on their band gap, for example, a band gap that allows visible light absorption. In some embodiments, polythiophene can be selected as a suitable photosensitive and conductive polymer. Other conductive polymers include poly(phenylenevinylenes) (PPVs), cyano-modified PPVs (CN-PPV, e.g., poly(2,5-di(hexyloxy)cyanoterephthalylidene, poly(5-(3,7-dimethyloctyloxy)-2-methoxy-cyanoterephthalylidene), methoxyethylhexyloxy-modified PPVs (MEH-PPV, e.g. poly[2-methoxy-5-(2-ethylhexyloxy)-1,4-phenylenevinylene]), phthalocyanines, and polyacetylenes. These materials are available in a range of molecular weights which can be selected for convenience in processing. Cathode materials can also provide scavenging of light with wavelengths that are not otherwise absorbed.

Proton-Conducting Medium

The proton-conducting medium can be a liquid or solid electrolyte. A conventional aqueous electrolyte can be used. Pure water has limited proton-conductivity due to the limited density of (solvated) protons. In some embodiments, an aqueous solution of a salt such as KCl can be used as the proton-conduction medium. In some embodiments, the proton-conducting medium comprises one or more of $Na_2SO_4$, $KHCO_3$, or KOH. Salts such as $KHCO_3$ can also provide a buffer function, with or without a separate salt. Without a buffer, local proton concentration and proton gradients may slow the proton conduction mechanisms by allowing accumulations of regions of space charge. A buffer can help minimize such effects. The pH of the electrolyte is not critical, but the buffering process can be more effective when the electrolyte is at least slightly basic (pH>7.0).

Solid electrolytes typically include polymers having exchangeable proton sites, for example, polysulfonates. In some embodiments, the solid electrolyte is NAFION® (DuPont), a sulfonated tetrafluoroethylene based fluoropolymer-copolymer. NAFION is one of a class of synthetic polymers with ionic properties resulting from the incorporation of perfluorovinyl ether groups terminated with sulfonate groups onto a tetrafluoroethylene backbone. As noted above, a desired property of the proton-conducting medium include is that it is permeable to protons while being impermeable to electrons (i.e., it is an electrical insulator), and is impermeable to oxygen and other larger atoms and molecules. The solid electrolyte can comprise bound water molecules and act as a conduit for supplying water (via diffusion through the layer) to the photoanode.

In some embodiments (as in FIG. 1), a GDL 108 supporting the copper catalyst 110 is disposed immediately adjacent to a NAFION proton-conducting medium 112 as a film. In these embodiments, this multilayer structure serves to separate the two half-reactions of the PEC. The proton-conducting medium is disposed on the anode side of the cell, and the GDL with electrocatalyst is disposed on the cathode side. Protons (generated at the photoanode) pass through the structure to reach the catalyst (at the surface of the GDL on the cathode side) where $CO_2$ reduction occurs. Other molecules including water, $O_2$ and $CO_2$, are confined to one side of the GDL. The conductive carbon paper of the GDL 108 also serves to provide electrical contact to the electrocatalytic material on the cathode.

Photoelectrochemistry of the iPVEC

The photoelectrochemical process in the iPVEC can be viewed as starting with the generation of photoelectrons ($e^-$) in the conduction band and holes ($h^+$) in the valence band of the photoanode semiconductor. The electrons are allowed to flow to the cathode which is located on the far side of a proton-conducting medium. The holes generated at the photoanode react with water molecules supplied to the device to generate oxygen gas and protons ($H^+$):

$$4h^+ + 2H_2O \text{ (liquid)} + h\nu \rightarrow O_2 \text{ (gas)} + 4H^+ \tag{5}$$

Eq. (5) now replaces Eq. (4). The redox potentials for Eq. (3) and Eq. (5) are +0.169 V and −1.23 V (CRC handbook) respectively. Gaseous oxygen evolves at the photoanode, while protons migrate to the cathode through the proton-conducting medium. The protons and electrons trapped by the Cu react with $CO_2$ supplied at the electrocatalytic cathode, resulting in $CO_2$ reduction products such as methane, ethane, formic acid, etc., depending on the catalyst present at the cathode. Equation (3) describes one reaction for a Cu cathode electrocatalyst as for the electrochemical cell. As noted above, the electrochemical cell can be optimized for a variety of different reduction products as desired. The energy for both the direct photocatalytic splitting of water and the power provided to drive the electrocatalytic reduction of $CO_2$ is provided by light as long as the photoanode reaction can provide the necessary net redox voltage.

With reference to FIG. 1, photoelectrons ($e^-$) are generated in the conduction band and holes ($h^+$) in the valence band of the $TiO_2$ nanowires of photoanode 104. The electrons flow to the cathode GDL 108 which is located on the far side of a proton-conducting medium 112. The holes react with water molecules to generate oxygen gas and protons ($H^+$) at the $TiO_2$ nanowires 104. Gaseous oxygen evolves at the $TiO_2$ nanowires 104, while protons migrate to the cathode GDL 108 through the proton-conducting medium 112. The protons and electrons react with $CO_2$ supplied at the cathode GDL 108, resulting in $CO_2$ reduction products.

The iPVEC provides a self-modulated device structure that can lead to increased $CO_2$ conversion efficiency. When using solar light, the intensity and illumination angles change during the day. Photoelectrochemical or photocatalytic reactions that depend on light absorption thus have constant shifts in efficiency throughout the day, and it can be challenging to adjust the external voltage applied to a conventional PEC to optimize the absorption and conversion efficiency. In an iPVEC, the electrons generated at the photoanode supply the power to drive the electrocatalytic reduction of $CO_2$ at the cathode. No external controls or adjustments are required. The iPVEC is self-modulated by the light absorption and the ongoing chemical reaction (chemical potentials specific to the composition and concentration of the anode and cathode materials). If the supply of $CO_2$ is interrupted, hydrogen gas is produced. The supply of $CO_2$ modulates the reaction products, and the production of $CH_4$ relative to $H_2$ can be controlled by $CO_2$ availability. Similarly, additional materials such as $NH_3$ or $H_2S$ can be used instead of $H_2O$; treatment with the iPVEC can be used to remove these materials.

Depending on the particular installation, an iPVEC device can be optimized in different ways. As noted above, the electrocatalyst and optional photosensitizer at the cathode can be selected to change the mix of $CO_2$ reduction products. The geometry can be modified to adapt to the available sources of light, water, and $CO_2$. Large planar designs and arrays of flat panels can be used in a manner similar to solar cell arrays on rooftops and in fields. An installation designed to reduce $CO_2$ from an exhaust pipe or smoke stack can have a tubular geometry (e.g., a honeycomb design) or other complex geometry designed to maximize the surface area of electrocatalyst exposed to the available $CO_2$. The $O_2$ produced at the photoanode can either be collected or vented. The methane or other reduction products can be used immediately as a fuel or collected in a storage tank or absorbing medium such as a bed of zeolyte beads. Tracking mechanisms and light concentrating devices, such as imaging and non-imaging lenses and reflectors, can be used to increase the total available flux of light delivered to an iPVEC. If natural light is unavailable, artificial light from any available source (such as arrays of LEDs, fluorescent tubes, and the like) can be used. The use of artificial light requires an external power source, but if the primary motivation for using the device is $CO_2$ reduction, then using only solar energy is not a necessary constraint.

Methods of Preparing iPVECs

Methods of preparing iPVECs are also disclosed. In some embodiments, a thin film sandwich design is provided, wherein a photoanode is formed adjacent to a proton conducting medium on which is also formed an electrocatalytic cathode.

The device is adapted to provide contact between water and the anode and $CO_2$ and the cathode. In some embodiments, the photoanode is formed on a porous transparent material such as ITO, and contact with water is provided through the porous material, which also allows evolved oxygen to exit from the vicinity of the photoanode and can be collected or allowed to diffuse away. The thin film depositions are can be prepared using techniques such as Langmuir-Blodgett films, electrophoretic deposition, dip coating and in-situ colloidal depositions, depending on the materials, which are known to those in the art.

Methods of Using iPVECs

Methods for reducing $CO_2$ are disclosed, wherein the methods comprise providing an iPVEC, exposing the photoanode to water and photons such that water is split into electrons, protons, and oxygen at the photoanode, reducing $CO_2$ electrocatalytically at the cathode using the electrons generated at the photoanode. The electrons from the photoanode are supplied on demand to the cathode at a potential sufficient to drive the electrochemical reduction of $CO_2$ at the cathode.

In some embodiments, the iPVEC comprises a photoelectrochemical cell with two electrodes comprising a photoanode and a cathode, with a proton-conducting medium disposed between said two electrodes. The water can be supplied as liquid water or water vapor.

The photoanode of the iPVEC is supplied with an oxidizable protonated material (gas or liquid), which can be any material that can be oxidized at the photoanode illuminated with sunlight. Water may be used as an oxidizable material, and the resulting oxidized product is oxygen (gas). In some embodiments, the oxidizable material can be ammonia, hydrogen sulfide, etc. The iPVEC is also supplied with a reducible material, such as $CO_2$. Protons produced as a result of oxidation diffuse across the proton-conducting medium to the cathode for use in reduction of products. However, in the absence of $CO_2$, the protons and electrons can recombine to produce hydrogen at the cathode.

Applications and Advantages

The novel structures described herein can be utilized to implement device designs of iPVECs for $CO_2$ conversion, using light (e.g., solar or LED illumination) as the sole power source, using low cost, scalable solution fabrication device processes, and non-toxic thin film materials for high efficient electrical transport and solar absorption. The devices and methods can operate at room temperature, ambient pressure reaction conditions and using inexpensive catalysts.

Thin film devices can be formed with large surface areas, and can be adapted to chimney filters, or to catalytic converters. The power source can be solar energy or a high efficiency light source such as an LED array. The reduction products can be used as a fuel for fuel cells, power plants, vehicles, rockets, etc., or to generate carbon-containing compounds for use as feedstock for other industrial synthetic processes. The only other by product, $O_2$, is useful and can be easily collected. For a smokestack, the geometry can include a set of tubes parallel to the $CO_2$ gas flow. In some embodiments, the geometry could include a "honeycomb" sort of filter, and several filters could be placed sequentially downstream of the gas to further filter any $CO_2$ not converted by upstream filters. In some embodiments, several filters, consisting of corrugated-shaped iPVECs, can be suspended parallel to the $CO_2$ gas stream, and sequential sets of filters can be disposed for further processing of the gas.

While layer thicknesses in most embodiments are generally small, the layers need not be planar. Cylindrical geometries can be used with either the anode or cathode on the inside of the cylinder (depending on the location of the light source). In some embodiments, more complex geometries, with the layers folded in various ways to create more surface area in a compact volume, can be implemented.

The iPVEC can be used for $CO_2$ greenhouse gas reduction or neutralization. It can also be used as part of a life support system, for example, in a spacecraft, space station, undersea habitat, or personal life support system to replace or supplement $CO_2$ scrubbers. An iPVEC allows ready reconversion of fuels for reuse, without using high temperature, expensive noble metal catalysts, or high pressure reaction conditions. The methods and devices are expected to be particularly useful in the Martian environment and to support exploration of Mars. $CO_2$, $H_2O$ and sunlight are plentiful as raw materials. Oxygen and fuels can be manufactured on site to provide both life support functions and fuel.

The device can be prepared using low-energy manufacturing methods at ambient temperatures and with low materials cost. The device can also be made extremely compact, flexible, efficient, and uses solar energy as the only power source.

Further advantages and applications include the ability of the methods and devices to work at low temperatures, without requiring high temperature processes. Additionally, the methods and devices utilize low cost materials and methods, avoiding the use of expensive noble metal as catalysts and high pressure reaction conditions.

Details with respect to the present invention will be further described by way of following examples to illustrate aspects of this invention, which examples are not intended to limit the scope or applicability of this invention.

EXAMPLES

Example 1

Electrochemical Cell

An electrochemical cell was constructed with an adaptation of laminar flow microfluidic testing (Brushett et al., 2009 and Whipple et al., 2010). The test platform consisted of a TEFLON® flow channel for the $CO_2$ gas stream and an acrylic flow channel for the liquid electrolyte stream (See FIG. 2). The cathode electrocatalyst was deposited on one side of a gas diffusion layer (GDL) substrate and in contact with a liquid electrolyte stream. A stainless steel current collector plate on the other side of the GDL was used to electrically connect to external circuitry. $CO_2$ from the gas flow channel passed through a window in the current collector plate and diffused across the GDL to react at the cathode catalyst. Methane and other hydrocarbons produced there diffused back through the GDL into the gas flow channel where they were collected for analysis by gas chromatography (GC).

A non-porous photoanode was used to allow cathode studies independent of the complexities of the PVC anode in the complete iPVEC device. The non-porous photoanode was fabricated by growing $TiO_2$ nanowires on an indium tin oxide (ITO) conductive layer coated onto a glass substrate. The electrolyte channel was 4 mm thick and had a flow channel approximately 5×20 mm machined through the entire thickness. The exposed area (~1 $cm^2$) of this flow channel thus determined the total active area of the cathode and anode layers above and below the channel.

Example 2

Photoanode Materials $TiO_2$ nanoparticles, nanowires and nanotubes, as well as $WO_3$ and ZnO nanowires, were synthesized using various solution processes as detailed below. The diameters ranged from 500 nm to 15 μm. The height-to-diameter aspect ratio (around 10:1) of the nanowires was varied by controlling the reaction conditions. In addition, density could be adjusted through Langmuir Blodgett monolayer assembly, dip coating, and spin coating on the appropriate electrode substrates.

$TiO_2$ nanotubes were grown on an ITO film using potentiostatic anodization. Fluorine doped Tin-Oxide coated glass can be also used in place of ITO coated glass. The $TiO_2$ nanotubes had an average length of 15 μm, an average outer diameter of 100 nm (inner diameter can be varied from 30 nm to 80 nm with growth conditions), and a higher surface area than nanowires, superior electrocatalytic properties and superior optical stability. The pristine nanotubes were annealed at 400° C. to convert amorphous $TiO_2$ to anatase (confirmed by Raman analysis) for higher photocatalytic responses.

$TiO_2$ nanowires were also grown via a hydrothermal process, adapted from (Wang, Y. et al., 2008 *Electrochimica Acta* 53, 7863) using sodium hydroxide and ethanol. The nanowires were dried in a furnace at 80° C., and annealed at 450° C. in air for an additional two hours.

The nanowire and nanotube assemblies were characterized by a variety of techniques to measure optoelectronic properties. Raman, FTIR and UV-visible spectroscopies were used to monitor every batch of materials to ensure structural and composition reproducibility. Atomic force microscopy and scanning electron microscopy (SEM) plus electrochemical and four-point probe resistance measurements were performed to characterize electron transport.

Raman and FTIR spectra indicated that the $TiO_2$—$WO_3$ nanocomposites contain the same crystal structures as their component materials. UV-Vis absorption spectra and the I-V characteristics of $TiO_2$ nanowires and $TiO_2$—$WO_3$ composite showed improved light absorption and mobility in the respective composites with respective sulfite and iodine electrolytes by standard four probe I-V measurements. Both improved over the individual constituents in photocurrent and most importantly, $CO_2$ conversion efficiency. Electron dispersive X-ray spectroscopy (EDS) and SEM imaging showed that the nanocomposites exhibited uniform assembly.

Example 3

Cathode Materials

The cathode was built from commercially available, electrically conductive, GDL substrates such as TORAY® carbon paper or SIGRACET® graphite GDL which ranged in thickness from 100 to 400 μm. These are available with varying amounts of polytetrafluoroethylene (PTFE) to yield varying hydrophobicity. Copper electrocatalysts were deposited on the GDL by electrodeposition (electroplating). Once deposited, the electrode assembly was annealed under a hydrogen atmosphere to reduce the nitrate salt to copper nanoparticles. The copper cathode was paired with a standard platinum-based anode prepared in a similar manner (created with platinum-black nanoparticles). This type of anode has a well-documented performance and served as a reliable counter electrode without introducing additional electrochemical limitations.

Example 4

Electrocatalyst Testing

The electrochemical cell of Example 1 combined with the electrodes described above allowed for an evaluation of the performance of cathode materials and provided a system for evaluating electrolytes. A SRI 8610D gas chromatography (GC) system with a thermal conductivity detector (TCD) was used in addition to IR gas analysis for characterization of gaseous reduction products. The GC column was chosen to separate many of the lighter compounds produced by $CO_2$ reduction. An acceptable separation was achieved with a helium carrier gas pressure of 50 psi and the following column temperature ramp: 40° C. for 2 minutes, then an increase of 10° C./min to 150° C. which was then held for 2 minutes.

SEM imaging directly after fabrication compared to after electrochemical $CO_2$ reduction show the Cu catalyst surface develops nano-scale pits and cracks thereby increasing its surface area for catalytic activity.

Example 5

Photocatalysis and Electrocatalysis Testing Platform

The electrocatalyst, GDL and photoelectrode materials were investigated separately using an electrochemical liquid cell and a photochemical catalysis dry cell. The three-electrode cell in the electrochemical catalysis was made gas tight with an outlet directly to the IR gas analysis cell for detection of methane or other hydrocarbon reduction products. A separate gas outlet was provided for the Pt counter electrode to prevent oxygen produced there from diluting the gas stream containing the reduction products. A strip of copper foil or painted or electrodeposited Cu catalysts was used for the working electrode. $CO_2$ was bubbled through the solution at high flow rates prior to the electrolysis to purge most of the oxygen and nitrogen from the cell. The $CO_2$ flow was then reduced to approximately 2 sccm and the Cu working electrode was kept at −2 V for at least 6 min. This working electrode typically produced currents of roughly 160-170 mA.

In the photocatalysis dry cell, a Hoya-Schott EX-250 UV source was used at a 10-15 cm distance from the sample through a quartz view port, $CO_2$ was bubbled through deionized water in an otherwise sealed chamber for 15 minutes. The exit valve was sealed after an additional minute. Gas (500 μL) was analyzed within a few minutes of light exposure. The GC analysis of composition and concentration was calibrated with gas standards, and confirmed by spectroscopy analysis data. Photocatalysis offers high selectivity for $CH_4$, with a small amount of $C_2H_6$. Like any gas-solid interaction, the yield is not as high as for electrocatalysis in a liquid cell, where predominant $C_2H_4$ and $C_2H_6$ were produced, as well as $H_2$. The comparisons of fuel production and energy conversion efficiency photocatalysis and electrocatalysis are listed in Table 1.

TABLE 1

Fuel production and energy conversion efficiency for photocatalysis and electrocatalysis

|  | Photo-catalytic | | Electro-catalytic | |
| --- | --- | --- | --- | --- |
| Cu Loading (mg/cm$^2$) | 0.01 | | 5 | |
| Input Power (mW) | 20 | | 77 | |
|  | Rate (mL/h) | Eff. (%) | Rate (mL/h) | Eff (%) |
| Hydrogen | 0 | 0 | 10.6 | 45 |
| Carbon Monoxide | 0 | 0 | 0.3 | 1 |
| Methane | 0.09 | 7 | 0 | 0 |
| Ethane | 0.01 | 2 | 0.1 | 2 |
| Ethylene | 0 | 0 | 0.2 | 4 |
| Total Efficiency (%) |  | 9 |  | 52 |

The optical to chemical energy conversion efficiency is defined by (Law et al., 2005)

$$\text{Optical conversion efficiency(percent)} = 100 I_c F_i [(\Delta G/n) - V_b]/W \quad (7)$$

where $I_c$ is the current density (mA/cm$^2$), W (mW/cm$^2$) the incident light intensity, $\Delta G$ (V) the standard free energy of formation of the products, n the number of moles of the product for one mole of $CO_2$, $V_b$ the bias voltage between the photocathode and the counter electrode, and $F_i$ the Faraday constant. Both $I_c$ and $V_b$ were expected to depend on the electrode materials used. In addition, dynamic photo current was measured to optimize overall impedance. The energy efficiency of the electrochemical reduction process was calculated using the following equation:

$$\eta = \frac{\Sigma_j(\Delta H_{j,comb}\eta_j)}{i(V_{applied} - V_{eq})}, \quad (6)$$

where η is the energy efficiency, $\Delta H_{j,comb}$ is the heat of combustion of species j in J/mol, $n_j$ is the molar flow rate of species j in mol/s, i is the reduction current in amperes, $V_{applied}$ is the potential of the cell during reduction in volts, and $V_{eq}$ is the open circuit equilibrium potential of the cell in volts. At these particular reduction conditions, this Cu cathode was approximately 52 V energy efficient in the creation of gaseous reduction products. Hydrogen production accounts for almost 45 percent of the energy used, ethylene 4 percent, ethane 2 percent and $CO_2$ 1 percent.

Example 6 iPVEC

Figure 3:
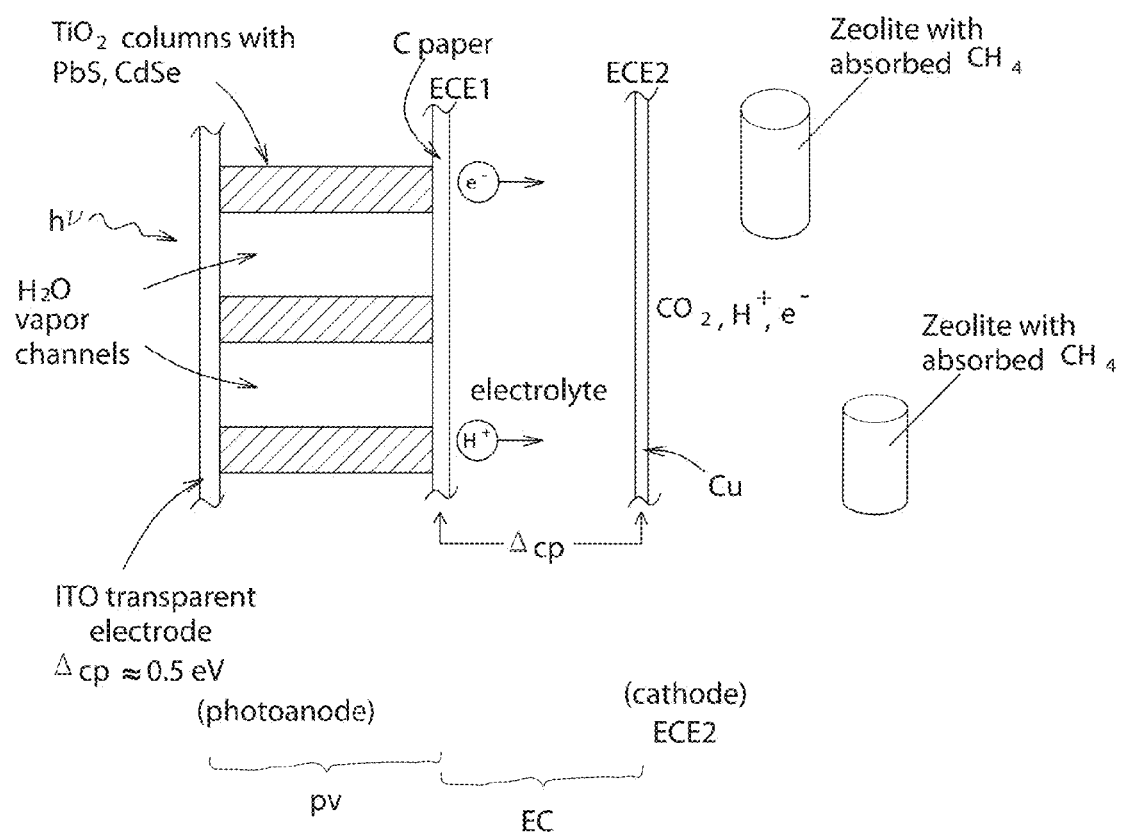
FIG. 3 illustrates an embodiment of an iPVEC.

A light beam (e.g., solar or LED), with wavelength range 260 nm≤λ≤600 nm (or 700 nm≤λ≤1500 nm, if a quantum dot of PbS is used for the photosensitive element), is concentrated and directed at an assembly of $TiO_2$ nanostructures (e.g., nanowires or nanotubes) that define one or more dissociation channel, as illustrated in FIG. 3. A first end of the channel(s) is defined by a transparent conductive electrode comprising indium titanium oxide (ITO) and/or fluorine-doped tin oxide and/or doped zinc oxide and/or carbon nanotubes and/or graphene. The channel(s) thereby defined contain and direct a flow of $H_2O$ vapor along the channel(s). The channels are preferably aligned approximately perpendicular to a plane of the transparent conductive electrode. The $H_2O$ vapor preferably has a pH greater than 7.

The $TiO_2$ nanostructures are doped with $WO_3$ and/or PbS quantum dots and/or with CdS and/or CdSe and/or CdTe and/or $ZnO_2$ and serve as a photocatalyst. The interstices between adjacent $TiO_2$ nanostructures contain the $H_2O$ vapor. The light beam and nanostructures interact, dissociate the water molecules, and liberate H$^+$ and e$^-$ according to reactions such as that of Eq. (6).

The $O_2$ is drawn off and may be used for other purposes. Many of the H$^+$ ions pass to a second end of a dissociation channel, which serves as a first electrochemical cell electrode (ECE), that is a GDL such as Toray Paper. The dissociation channel(s) and first and second channel ends serve as a photoanode. Electrical charges on the H$^+$ ions are electrochemically transferred via a proton-conducting electrolyte or membrane (e.g., NAFION® or $Na_2SO_4$ or $KHCO_3$ or KOH), having a preferred thickness of 1-20 μm, and are received at a cathode (second ECE) comprising Cu or Co nanoparticles or Cu passivated with polyvinylpyrrolidone (PVP) and/or nanoparticles of Au and/or Ag. The Cu or Co nanoparticles are optionally distributed over a gas diffusion layer (GDL), which may comprise carbon paper (e.g., Toray paper) and a hydrophobic binder (e.g., TEFLON®). The first and second ECEs plus the membrane serve as an electrochemical cell.

A non-zero chemical potential ΔCP, with a value of about +0.5 eV, develops between the first and second ECEs and serves to direct the H$^+$ ions and/or the electrons toward the second ECE. $CO_2$ molecules are provided adjacent to the second ECE for reduction to produce hydrocarbons. The second ECE optionally includes a graphene sheet coated with Cu or Co molecules distributed thereon.

Electrons are generated by photodissociation of $TiO_2$ (optionally loaded with PbS, CdSe and/or CdTe, at the photoanode) and are transferred to the second ECE via the electrolyte where they support conversion of $CO_2$ to hydrocarbons, such as $CH_4$, $C_2H_6$ and $C_2H_4$, by redox reactions such as that of Eq. (5) with an estimated branching ratio of about 10 percent. The particular redox reaction at the Cu electrode will depend on the chemical potential associated with the photoanode output. The Cu or Co that comprises the second ECE is provided as nanoparticles, preferably "nanopolygons," which are m-sided polygons (e.g., m=4, 5, 6) and initially have sharp edges. Optionally, the second ECE comprises a photosensitizer, such as polythiophene and/or its derivatives, to produce additional H+ ions. A nanocube morphology serves as the most active catalytic site(s) to receive and temporarily hold one or more $CO_2$ molecules and H+ ions to promote reduction of $CO_2$ by redox reactions such as the reaction in Eq. (3), which also produce ethylene ($C_2H_4$) and ethane ($C_2H_6$), with estimated branching ratios of about 4 percent and 2 percent, respectively. The fraction of hydrocarbons are estimated and are collected at or near the second ECE, for immediate or subsequent use as fuel, and the $H_2O$ molecules are drawn off and used for other purposes. The percentage composition of different hydrocarbon species produced depends upon the catalyst morphology. As the hydrocarbons are produced at the second ECE, these substances are drawn off and received at a porous assembly of aluminosilicate molecules (e.g., ZEOLITE®). The adjacent $CO_2$ molecules are not absorbed as readily by the aluminosilicate assembly and are primarily dispersed in the ambient medium, rather than being received and held on surfaces of the aluminosilicate assembly. Periodically, the aluminosilicate assembly with the hydrocarbons absorbed thereon is removed and replaced by a "clean" aluminosilicate assembly.

The H+ and e⁻ particles do not require use of a battery for transport to the cathode (ECE2), and the EC chemical potential is believed to provide energy potentials for the H+ and e⁻ particles that include values between −1.23 eV and +0.169 eV, which are redox potentials P for reduction of $CO_2$. The redox potentials for formation of $C_2H_2$ or $C_2H_4$ have similar redox values.

FIG. 3 illustrates a suitable configuration for practicing the embodiment disclosed in Example 6. A light beam hv passes through a partly or fully transparent electrode 31 (a first photoanode electrode, comprising indium titanium oxide and/or fluorine-doped tin oxide and/or doped zinc oxide and/or carbon nanotubes and/or graphene) and is received by $H_2O$ vapor contained in $H_2O$ vapor channels 32. The channels 32 are defined by nanostructures (e.g., columns) 33 of that are photosensitized by quantum dots of PbS or by nanoparticles of $WO_3$, $ZnO_2$, CdS, CdSe and/or CdTe. Molecules of the H20 vapor in the channels 32 interact with the light beam and the $TiO_2$ nanostructures 33, and some of these molecules are dissociated according to reactions such as Eqs. (1) and/or (2) to produce H+ ions and electrons. H+ ions and electrons thus produced are received at a second photoanode electrode 34, which also serves as a first electrochemical electrode (ECE) and comprises carbon paper (e.g., Toray paper). A second ECE 35 is spaced apart from the first ECE 34 by a proton-conducting membrane or electrolyte 36 that comprises at least one of NAFION or $Na_2SO_4$, or $KHCO_3$ or KOH. The second ECE preferably comprises Cu or Co nanoparticles or Cu passivated with polyvinylpyrrolidone (PVP) and/or nanoparticles of Au and/or Ag, and has a positive chemical potential ΔCP relative to the first ECE 34. The first and second ECEs, 34 and 35, and the membrane 36 comprise an electrochemical cell (EC). A portion of the electrical charges associated with the H+ ions and with the electrons (e⁻) is transferred from the first ECE 34, across the membrane 36, to the second ECE 35, and a portion of these charges react with $CO_2$ gas that is provided adjacent to the second ECE, according to reactions such as Eq. (3), that reduce a portion of the $CO_2$ and produce hydrocarbons such as $CH_4$, $C_2H_4$ and/or $C_2H_6$. The hydrocarbons thus produced are preferably absorbed by an assembly of porous aluminosilicate 38, such as ZEOLITE, which is positioned adjacent to the second ECE 35.

Some Advantages of the Disclosed Invention

The invention disclosed here uses a light source, but no battery or other source of electrical power, to reduce $CO_2$ molecules and to provide one or more species of hydrocarbon molecules. Where a light concentrator is used, localized heating from this light is sufficient to initiate the subsequent reactions, at ambient (room) temperature. Solar or LED light can be used here, Provision of temperatures as high as T=1600° C., which is often required in a conventional approach to $CO_2$ reduction, is not required in the disclosed invention. Local pressure at or even below atmospheric pressure is sufficient for the disclosed invention. Use of expensive and toxic catalysts, such as Pt or Pd, is not required here. A source of $H_2O$ molecules replaces a hydrogen supply that is conventionally required. Use of $H_2O$ rather than $H_2$, also improves the associated photon efficiency, to an estimated 10 percent for hydrocarbon production, for the disclosed process. Use of an integrated photoanode and electrochemical cell, with only three distinct electrodes, provides further efficiencies.

REFERENCES

Brushett, F. R. et al, Jour. Electrochem. Soc., vol. 156 (2009) 565
Canfield, D. et al, Jour. Electrochem. Soc., vol. 130 (1983) 1772
Gattrell, M. et al, Jour. Electroanalytical Chem., vol. 594 (2006) 1
Ito, K. et al, Bull. Chem. Soc. of Japan, vol. 57 (1984) 583
Jitaru, D. A., et al, Jour. Appl. Electrochemistry vol. 27 (1997) 875-889
Monnier, A. et al, Jour. Electroanalytical Chem., vol. 112 (1989) 383
Morisaki, H. et al, Appl. Phys. Lett., vol. 29 (1976) 338
Saladin, F. et al, Jour. Chem. Soc. —Chem Commun. (1995) 533
Taniguchi., Modern Aspects of Electrochemistry, vol. 20 (1989) 327
Wang, Y. et al, Electrochimica Acta, vol. 53 (2008) 7863
Whipple, D. T. et al, Electrochemical and Solid State Lett, vol. 13 (2010) 109
Zheng, M. J. et al, Phys. Lett., vol. 363(2002) 123

What is claimed is:
1. A system for converting $CO_2$, to one or more hydrocarbons, comprising:
first and second photovoltaic (PV) electrodes, spaced apart and configured to provide at least one channel, defined by at least two nanostructures that are aligned approximately perpendicular to a surface of said first PV electrode, he nanostructures comprising at least one of nanotubes and nanowires, extending between the first and second PV electrodes, where at least one of the first and second electrodes comprises a conductive electrode, partly or fully transparent at a channel end, where the at least one channel receives a light beam, receives at least two $H_2O$ molecules and causes the at least two $H_2O$ molecules to dissociate into at least four H+ ions, at least four electrons, and at least one oxygen-containing molecule;

wherein the light beam has at least one wavelength in a range of at least one of 260-600 nm and 700-1500 nm;

wherein the second PV electrode also serves as a first electrochemical cell electrode (ECE) of an electrochemical cell;

a second electrochemical cell electrode (ECE), spaced apart from the first ECE and comprising an electrocatalyst that is configured to receive at least one $CO_2$ molecule, at least four H+ ions and at least four electrons and to reduce the at least one molecule of $CO_2$ to provide at least one hydrocarbon molecule that is at least one of $CH_4$, $C_2H_4$ and $C_2H_6$, with a total branching ratio of at least about 10 percent; and a proton-conducting electrolyte, positioned between and connected to the first ECE and the second ECE;

wherein the second ECE has an associated positive chemical potential relative to a chemical potential of the first ECE;

wherein the second ECE comprises nanostructures comprising at least one of Cu and C, distributed over a gas diffusion layer, the gas diffusion layer comprises at least one of (i) carbon fibers and a hydrophobic binder and (ii) an intrinsically conducting polymer that comprises polythiophene;

wherein electrical charges associated with the H+ ions and with the electrons move in the electrolyte from the first ECE toward the second ECE; and wherein the device has no battery or other source of electrical power.

2. The system of claim 1, wherein said at least one channel comprises nanostructures comprising $TiO_2$, and at least one of $WO_3$, CdS, CdSe, CdTe, Au and Ag.

3. The system of claim 1, wherein said at least one channel comprises nanostructures comprising at least one quantum dot of at least one of PbS and CdS.

4. The system of claim 1, wherein said second PV electrode comprises carbon paper.

5. The system of claim 1, wherein said transparent conductive electrode comprises at least one of indium tin oxide, fluorine-doped tin oxide, carbon nanotubes and graphene.

6. The system of claim 1, wherein said second ECE comprises an electro-catalyst capable of enhancing reduction of said at least one $CO_2$ molecule.

7. The system of claim 1, wherein said electrolyte comprises at least one of NAFION®, $Na_2SO_4$, $KHSO_3$ and KOH and has a thickness in a range of about 1-20 μm.

8. The system of claim 1, wherein said $H_2O$ molecules comprise a buffered electrolyte having a pH greater than about 7.

9. The system of claim 1, wherein said second ECE has said chemical potential that is greater than said chemical potential of said first ECE by at least about +0.5 eV.

10. The system of claim 1, wherein said second ECE has a porosity up to about 80 percent.

11. An integrated photovoltaic cell and electrochemical cell, comprising:

a photovoltaic (PV) cell comprising first and second spaced apart electrodes and at least one light-receiving channel, which together comprise a photoanode, that receives a light beam, having at least one wavelength in a range of at least one of 260-600 nm and 700-1500 nm, where the channel receives at least two $H_2O$ molecules and exposes the at least two $H_2O$ molecules to the light beam and dissociates the at least two $H_2O$ molecules into at least four H+ ions, at least four electrons and at least one oxygen-containing molecule; and an electrochemical cell, comprising the second electrode and a third electrode, spaced apart from each other by a proton-conducting electrolyte, where the third electrode has an associated positive chemical potential ΔCP relative to the second electrode and the third electrode is configured to receive at least one $CO_2$ molecule and to permit the at least one $CO_2$ molecule to interact with the H+ ions and the electrons, and to thereby become reduced, and to produce at least one hydrocarbon, wherein operation of the integrated photovoltaic cell and electrochemical cell does not use a battery or equivalent source of electrical power; and wherein said third electrode comprises at least one of Cu nanoparticles and Co nanoparticles, which are passivated with at least one of polyvinylpyrrolidone (PVP) nanoparticles, Au nanoparticles and Ag nanoparticles.

12. The integrated cells of claim 11, wherein said first electrode comprises $TiO_2$ nanostructures, doped or impregnated or coated with at least one of $WO_3$, ZnO, CdS, CdSe, CdTe, Au nanoparticles, Ag nanoparticles, PbS quantum dots and CdS quantum dots.

13. The integrated cells of claim 11, wherein said at least one hydrocarbon molecule produced comprises at least one of $CH_4$, $C_2H_4$ and $C_2H_6$.

* * * * *